(No Model.)
W. T. FAIN.
HOISTING APPARATUS.
No. 410,507. Patented Sept. 3, 1889.
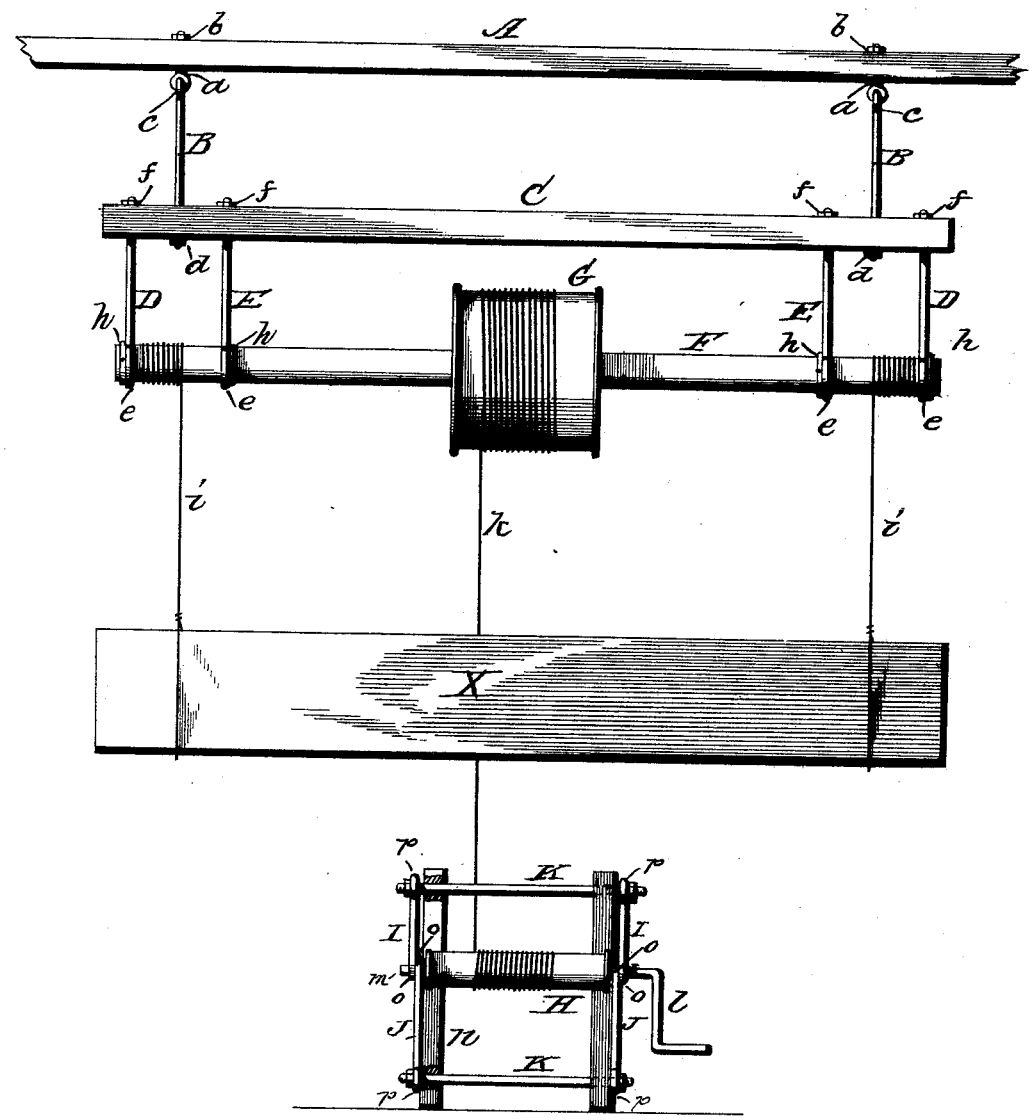

UNITED STATES PATENT OFFICE.

WILLIAM TILMON FAIN, OF LEAD HILL, ARKANSAS.

HOISTING APPARATUS.

SPECIFICATION forming part of Letters Patent No. 410,507, dated September 3, 1889.

Application filed May 21, 1889. Serial No. 311,537. (No model.)

*To all whom it may concern:*

Be it known that I, WILLIAM TILMON FAIN, a citizen of the United States, residing at Lead Hill, in the county of Boone and State of Arkansas, have invented certain new and useful Improvements in Hoisting Apparatus; and I do hereby declare that the following is a full, clear, and exact description of the same, reference being had to the annexed drawings, making a part of this specification, and to the letters and figures of reference marked thereon.

The present invention has for its object to provide a simple and effective machine for raising heavy bodies and one that possesses great power and can be easily and conveniently operated from the ground without the usual gearing forming a part of the common hoisting apparatus. The above objects I attain by the construction, substantially as shown in the drawing and hereinafter described and claimed.

In the accompanying drawing, which represents a front elevation of the machine, A designates the joist, to which it is attached by means of eyebolts $a$, passing up through the same and held thereto by nuts $b$, engaging the screw-threaded ends of said bolts. From the eyebolts $a$ are suspended the hanger-rods B, having eyes $c$, which engage with the eyes of the bolts, and the lower ends of the rods pass through a horizontal bar or beam C, the same being held to the rods by the nuts $d$ engaging with the screw-threaded ends thereof. The manner of connecting the rods and bolts together by means of the eyes thereon allows of the beam C swinging laterally sufficiently to prevent any strain on the joist A when any heavy body is being raised.

Depending from the beam C are hangers D E, two at each end of said beam, and at their lower ends have rings $e$ to form bearings for the ends of a horizontal roller F, which carries a drum G. The hangers above described are connected to the beam C by nuts $f$ engaging with the screw-threaded ends thereof which pass up through the beam. The bearing ends of the hangers are retained in position by means of collars $h$, removably secured on the roller, and the rings $e$ form stops to limit the winding of the chains or ropes in a horizontal direction upon the roller, the rings serving this purpose as well as bearings for the ends of the roller. The chains or ropes $i$ at their lower ends are looped around the object to be raised, said object being shown at X, and a chain or rope $k$, which passes around the drum G, connects with a windlass H, provided with a crank-handle $l$ for turning it. This crank-handle is detachably connected in any well-known manner to one end of the shaft $m$ of the windlass, and the end of the shaft has its bearings in eyes $o$ of supporting-rods I J. These rods have eyes $p$ at their opposite ends, through which pass the ends of brace-rods K, said rods passing through holes in the upright posts $n$, said supporting-rods being held on the ends of the supporting rods by nuts or other well-known means.

It will be seen that a very simple and inexpensive frame is provided for attaching the windlass thereto and can be attached to a single post as well as two posts, or, if preferred, to the body of a tree. In connecting the windlass to a tree holes are made through the body of said tree to receive the rods K, and then the rods J are connected to the projecting ends thereof and afterward engage the shaft of the windlass with the eyes $o$. The rods I are connected in like manner to the upper one of the brace-rods K and to the shaft of the windlass, and then the crank-handle is attached, when the device is complete. This can be done very expeditiously and without much trouble, and can be as readily taken apart and removed to another place where required for use and put together without the necessity of any tools other than one to bore the holes for the brace-rods K.

Having now fully described my invention, what I claim as new, and desire to secure by Letters Patent, is—

1. In a hoisting apparatus, the combination, with a suitable windlass, of a beam C, connected to a support by hanger-rods B and the eyebolts $a$, and the roller F, suspended from the beam and carrying drum G, and the hoisting-ropes passing around the roller and drum, substantially as and for the purpose set forth.

2. In a hoisting apparatus, the beam C and means for suspending it from a suitable object, in combination with the hangers D E, connected to the beam and provided with rings e, to serve as bearings, the roller F, having its ends supported by the rings of the hangers and carrying drum G, the ropes extending around the roller and drum, and a suitable windlass to which the rope of the drum is connected, substantially as and for the purpose specified.

3. In a hoisting apparatus, the combination, with a suitable windlass, of the frame for supporting the same, consisting of the supporting-rods I J, having eyes on their ends, and the horizontal brace-rods K, having their ends passing through the eyes of the supporting-rods, substantially as and for the purpose specified.

4. In a hoisting apparatus, the hanger-rods B and eyebolts c, as a means for supporting the beam C, the hangers D E, having the rings e, and the roller F, carrying drum G, in combination, with the windlass H and the frame for supporting same, consisting of the horizontal brace-rods K and the supporting-rods I J, having eyes at their ends, substantially as and for the purpose set forth.

In testimony that I claim the above I have hereunto subscribed my name in the presence of two witnesses.

WILLIAM TILMON FAIN.

Witnesses:
J. T. TIPTON,
JOHN TRIMBLE.